US010180545B2

(12) United States Patent
Wang et al.

(10) Patent No.: US 10,180,545 B2
(45) Date of Patent: Jan. 15, 2019

(54) ALIGNMENT CORRECTION FOR OPTICAL ISOLATOR IN A COAXIAL TRANSMITTER OPTICAL SUBASSEMBLY (TOSA)

(71) Applicant: Applied Optoelectronics, Inc., Sugar Land, TX (US)

(72) Inventors: Chong Wang, Stafford, TX (US); Che-shou Yeh, New Taipei (TW); Jianhong Luo, Ningbo (CN); Haohui Mao, Ningbo (CN); I-Lung Ho, Sugar Land, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 0 days.

(21) Appl. No.: 15/073,342

(22) Filed: Mar. 17, 2016

(65) Prior Publication Data

US 2017/0269311 A1    Sep. 21, 2017

(51) Int. Cl.
*G02B 6/42* (2006.01)
*G02B 6/32* (2006.01)
(Continued)

(52) U.S. Cl.
CPC .......... *G02B 6/4208* (2013.01); *G02B 6/32* (2013.01); *G02B 6/4246* (2013.01);
(Continued)

(58) Field of Classification Search
None
See application file for complete search history.

(56) References Cited

U.S. PATENT DOCUMENTS 5,074,682 A * 12/1991 Uno ................. G02B 6/327
                                                385/33
5,195,155 A *  3/1993 Shimaoka ........... G02B 6/4226
                                                385/33
(Continued)

FOREIGN PATENT DOCUMENTS

WO    2015013853 A1    2/2015

OTHER PUBLICATIONS

PCT Search Report and Written Opinion dated Nov. 22, 2016, received in corresponding PCT Application No. PCT/US16/50401, 11 pgs.

(Continued)

*Primary Examiner* — Oommen Jacob
(74) *Attorney, Agent, or Firm* — Grossman Tucker Perreault & Pfleger, PLLC; Norman S. Kinsella

(57) ABSTRACT

A coaxial transmitter optical subassembly (TOSA) with optical isolator alignment correction may be used in an optical transceiver for transmitting an optical signal at a channel wavelength. The coaxial TOSA includes an optical fiber coupling receptacle extending from a laser package. The laser package may include a laser diode and a lens to focus laser light emitted from the laser diode onto an optical fiber. The laser diode and lens are aligned along a first longitudinal axis of the laser package parallel to a transmission path of the laser light. An optical isolator located in the transmission path is aligned along a second longitudinal axis of the laser package. The second longitudinal axis is coincident with a centerline of the laser package, and the first longitudinal axis is offset from the second longitudinal axis by a predetermined offset distance to compensate for light shifting characteristics of the isolator.

23 Claims, 7 Drawing Sheets

(51) Int. Cl.
  *H04J 14/02* (2006.01)
  *H04B 10/40* (2013.01)
  *H04B 10/50* (2013.01)
  *H04B 10/079* (2013.01)

(52) U.S. Cl.
  CPC ....... *G02B 6/4286* (2013.01); *H04B 10/0795* (2013.01); *H04B 10/40* (2013.01); *H04B 10/503* (2013.01); *H04J 14/02* (2013.01)

(56) References Cited

U.S. PATENT DOCUMENTS

| | | | | |
|---|---|---|---|---|
| 5,519,467 | A * | 5/1996 | Suzuki | G02F 1/093 359/281 |
| 5,566,259 | A * | 10/1996 | Pan | G02F 1/093 359/484.03 |
| 6,430,323 | B1 * | 8/2002 | Kokkelink | G02B 6/266 359/280 |
| 6,697,414 | B1 | 2/2004 | Kato et al. | |
| 7,054,527 | B2 * | 5/2006 | Fernier | G02B 6/4201 385/39 |
| 8,848,277 | B2 * | 9/2014 | Sandstrom | H01S 3/08 359/237 |
| 8,878,095 | B2 * | 11/2014 | Li | B23K 26/066 219/121.75 |
| 8,891,167 | B2 * | 11/2014 | Iida | G02F 1/093 359/280 |
| 2002/0092975 | A1 * | 7/2002 | Ito | G01R 1/071 250/227.11 |
| 2003/0063873 | A1 * | 4/2003 | Matsushima | G02B 6/4204 385/93 |
| 2003/0081908 | A1 | 5/2003 | Gage et al. | |
| 2005/0025420 | A1 * | 2/2005 | Farr | G02B 6/4209 385/33 |
| 2005/0100263 | A1 | 5/2005 | Shi | |
| 2005/0157976 | A1 | 7/2005 | Furukawa et al. | |
| 2005/0220163 | A1 * | 10/2005 | Okuta | G02B 6/02085 372/92 |
| 2007/0064761 | A1 * | 3/2007 | Togo | G02B 6/4206 372/107 |
| 2007/0154218 | A1 * | 7/2007 | Sommer | G02B 6/29365 398/85 |
| 2008/0085078 | A1 | 4/2008 | Teo | |
| 2008/0166085 | A1 * | 7/2008 | Ito | G02B 6/421 385/11 |
| 2008/0187325 | A1 * | 8/2008 | McCallion | G02B 6/4201 398/192 |
| 2013/0039660 | A1 | 2/2013 | Ho et al. | |
| 2014/0300962 | A1 * | 10/2014 | Hosokawa | B23K 26/08 359/484.03 |
| 2014/0341578 | A1 * | 11/2014 | Ho | H04J 14/0246 398/68 |
| 2015/0078758 | A1 * | 3/2015 | Lee | H04B 10/40 398/135 |
| 2015/0256261 | A1 * | 9/2015 | Ho | G02B 6/43 398/139 |
| 2016/0047998 | A1 | 2/2016 | Amirkiai et al. | |
| 2016/0139351 | A1 | 5/2016 | Okada | |
| 2016/0161685 | A1 * | 6/2016 | Xu | G02B 6/4204 385/14 |
| 2017/0075079 | A1 | 3/2017 | Lin | |

OTHER PUBLICATIONS

Office Action dated Nov. 4, 2016 in U.S. Appl. No. 14/850,367, 9 pgs.

\* cited by examiner

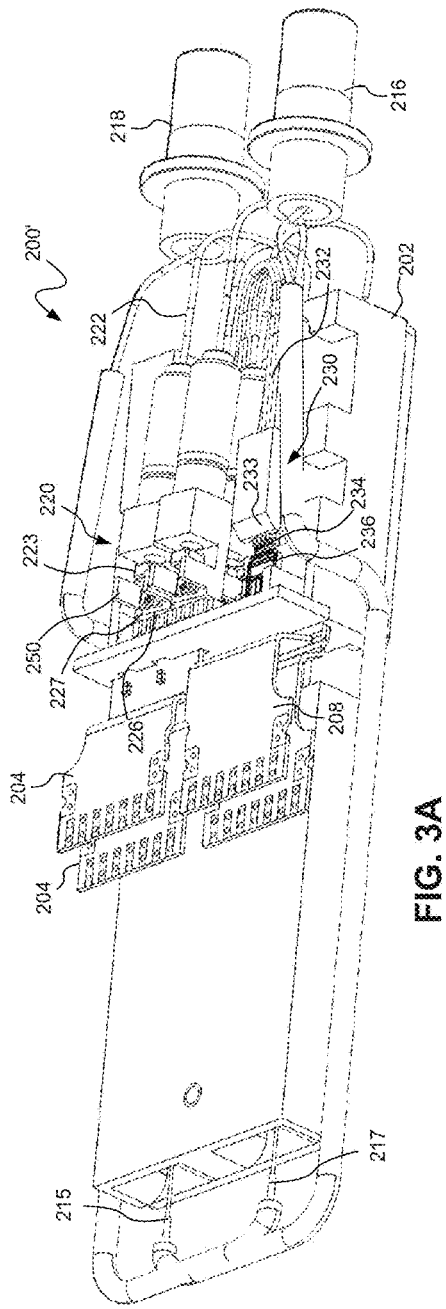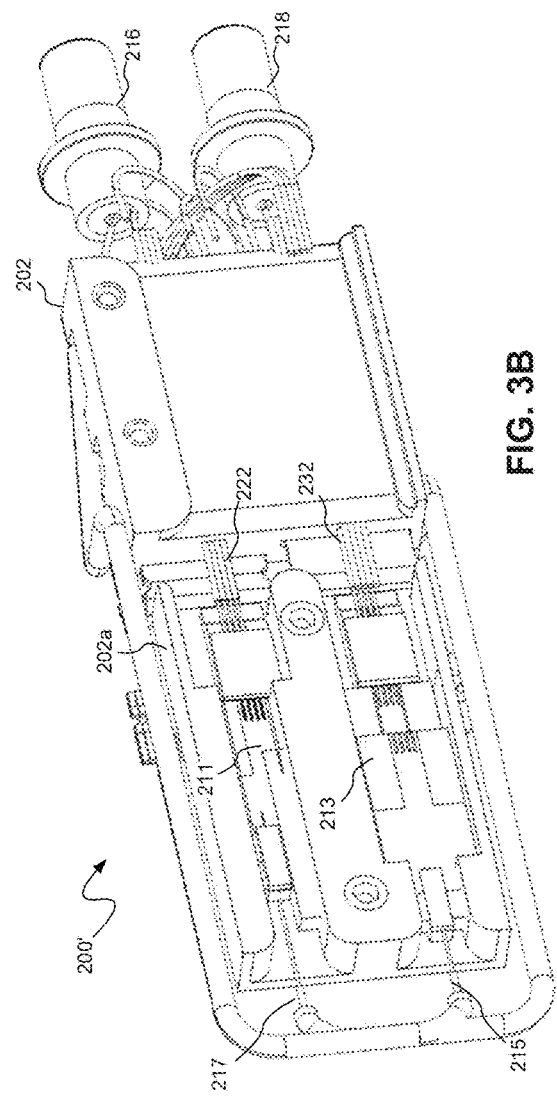

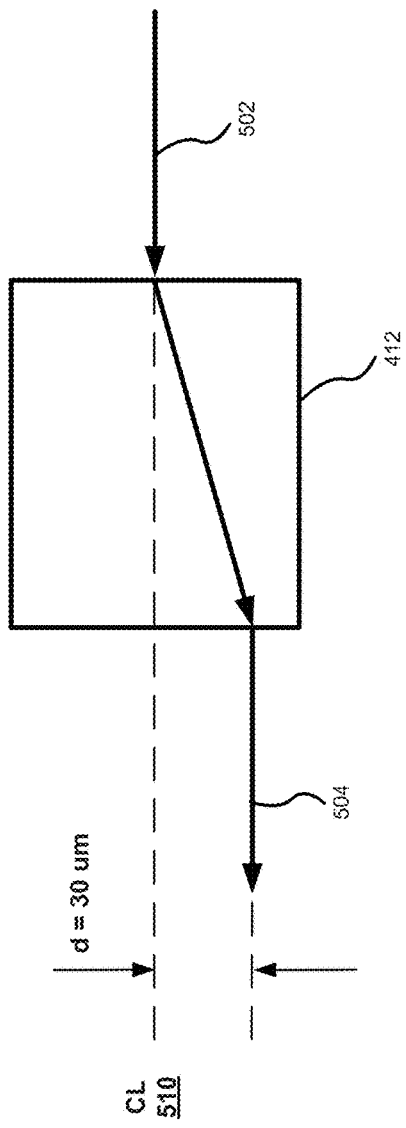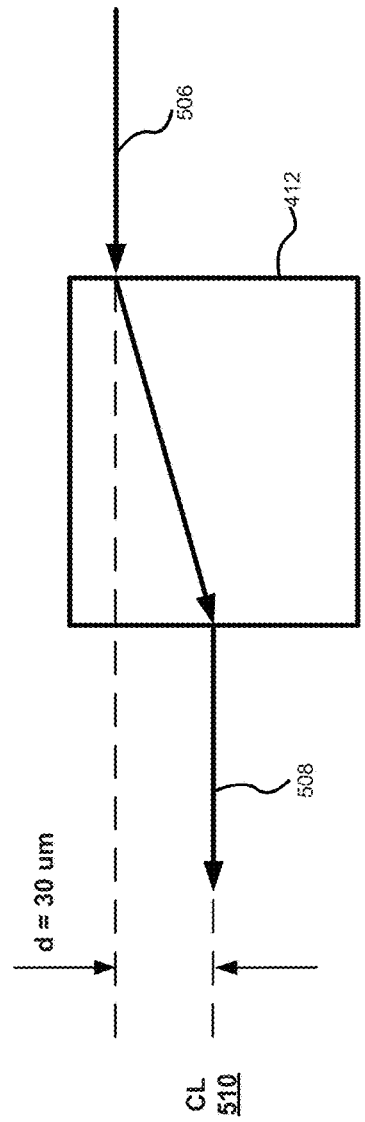
FIG. 5A
FIG. 5B

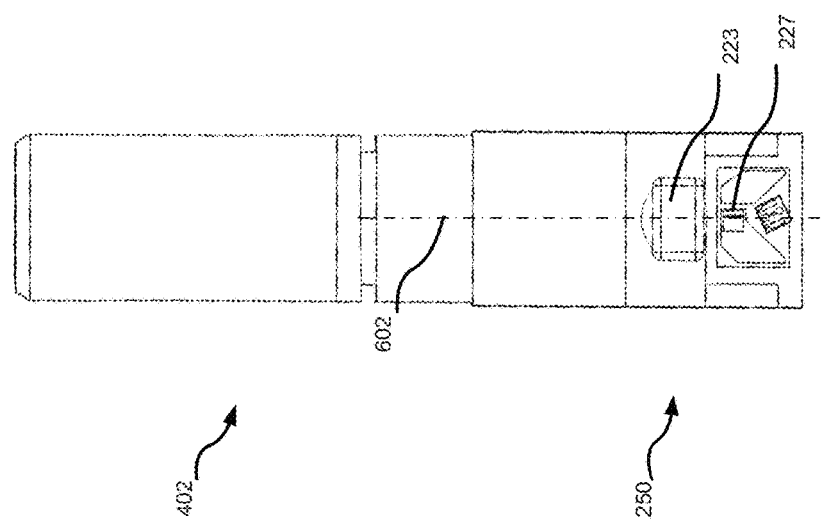
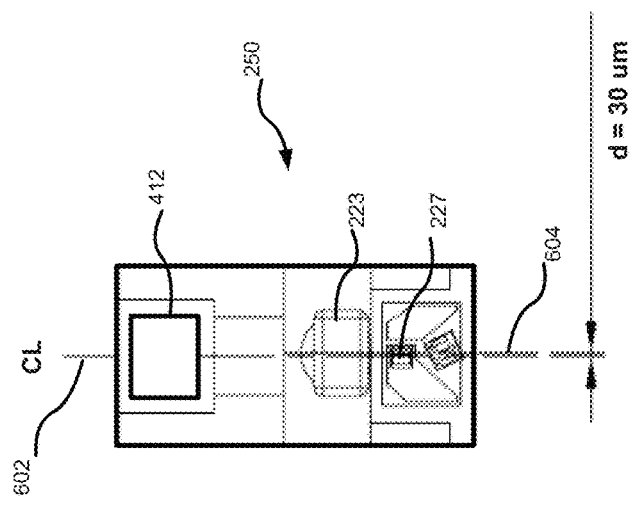
FIG. 6A
FIG. 6B

US 10,180,545 B2

ALIGNMENT CORRECTION FOR OPTICAL ISOLATOR IN A COAXIAL TRANSMITTER OPTICAL SUBASSEMBLY (TOSA)

TECHNICAL FIELD

The present disclosure relates to coaxial transmitter optical subassemblies (TOSAs) and more particularly, to alignment correction for optical isolators in a coaxial transmitter optical subassembly (TOSA) for use in an optical transceiver.

BACKGROUND INFORMATION

Optical transceivers are used to transmit and receive optical signals for various applications including, without limitation, internet data center, cable TV broadband, and fiber to the home (FTTH) applications. Optical transceivers provide higher speeds and bandwidth over longer distances, for example, as compared to transmission over copper cables. The desire to provide higher speeds in smaller optical transceiver modules for a lower cost has presented challenges, for example, with respect to thermal management, insertion loss, and manufacturing yield. As the size of the optical transceiver module and its components decreases, manufacturing tolerances typically become more difficult to achieve.

Optical transceiver modules generally include one or more laser packages for housing a laser or laser diode and for providing electrical connections and optical couplings to the laser. An optical coupling path, between the laser and the optical fiber, may generally include a lens to focus the laser light and an optical isolator element to prevent back reflection of the laser light. One challenge with optical transceiver module assembly is the process of bonding the optical fiber to the laser package with a relatively high degree of precision to reduce signal losses that may result from misalignment or other coupling problems. The optical isolator may increase these difficulties by inducing spatial shifts in the laser light. Although these shifts may be relatively small, their effects can become more significant as transceiver modules undergo further miniaturization.

BRIEF DESCRIPTION OF THE DRAWINGS

These and other features and advantages will be better understood by reading the following detailed description, taken together with the drawings wherein:

FIGS. 3A and 3B are top and bottom perspective views, respectively, of another embodiment of an optical transceiver module including coaxial TOSAs with optical fiber coupling receptacles.

FIGS. 5A and 5B illustrate the light shifting effect of an optical isolator consistent with an embodiment of the present disclosure.

FIGS. 6A and 6B are top exterior and cross-sectional views of another embodiment of the coaxial TOSA with alignment compensation for use in the optical transceiver modules shown in FIGS. 2, 3A, and 3B.

DETAILED DESCRIPTION

A coaxial transmitter optical subassembly (TOSA) with optical isolator alignment correction, consistent with embodiments of the present disclosure, may be used in an optical transceiver for transmitting an optical signal at a channel wavelength. The coaxial TOSA may include an optical fiber coupling receptacle extending from a laser package. The laser package includes a laser or laser diode, a lens and an optical isolator. The lens is configured to focus the laser light onto one end of an optical fiber within the optical fiber coupling receptacle. The optical isolator is configured to reduce or eliminate reflection of the laser light back towards the laser. Optical isolators, however, generally induce a shift in the path of the laser light, which may cause a misalignment between the light transmission path and the optical fiber end and reduce optical transmission efficiency. To compensate for this misalignment, the laser and lens may be positioned within the laser package with a geometric offset that is based on the degree of shift induced by the isolator, as will be explained in greater detail below. An optical transceiver may include multiple coaxial TOSAs with laser packages coupled to optical fiber coupling receptacles and stacked in the transceiver housing.

As used herein, "channel wavelengths" refer to the wavelengths associated with optical channels and may include a specified wavelength band around a center wavelength. In one example, the channel wavelengths may be defined by an International Telecommunication (ITU) standard such as the ITU-T dense wavelength division multiplexing (DWDM) grid. The term "coupled" as used herein refers to any connection, coupling, link or the like and "optically coupled" refers to coupling such that light from one element is imparted to another element. Such "coupled" devices are not necessarily directly connected to one another and may be separated by intermediate components or devices that may manipulate or modify such signals.

Figure 1A:
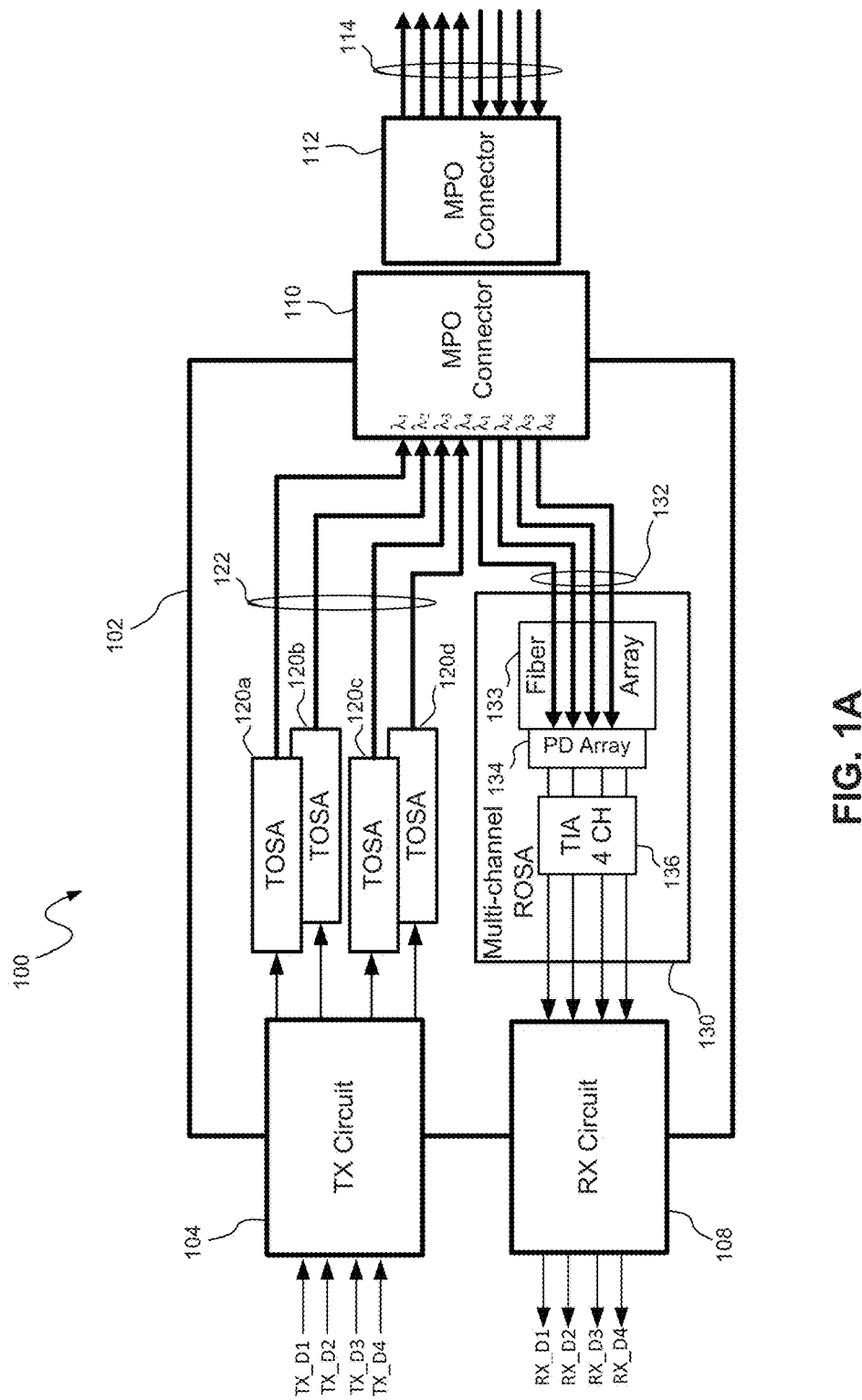
FIGS. 1A and 1B are functional block diagrams of multiple channel optical transceivers, consistent with embodiments of the present disclosure.

Referring to FIG. 1A, an optical transceiver 100, consistent with embodiments of the present disclosure, is shown and described. In this embodiment, the optical transceiver 100 transmits and receives four (4) channels using four different channel wavelengths ($\lambda_1, \lambda_2, \lambda_3, \lambda_4$) and may be capable of transmission rates of at least about 10 Gbps per channel. In one example, the channel wavelengths $\lambda_1, \lambda_2, \lambda_3, \lambda_4$ may be 1270 nm, 1290 nm, 1310 nm, and 1330 nm, respectively. The optical transceiver 100 may also be capable of transmission distances of 2 km to at least about 10 km. The optical transceiver 100 may be used, for example, in internet data center applications or fiber to the home (FTTH) applications.

This embodiment of the optical transceiver 100 includes multiple transmitter optical subassemblies (TOSAs) 120a-d for transmitting optical signals on different channel wavelengths and a multi-channel receiver optical subassembly (ROSA) 130 for receiving optical signals on different channel wavelengths. The TOSAs 120a-d and the multi-channel ROSA 130 are located in a transceiver housing 102. A transmit connecting circuit 104 and a receive connecting circuit 108 provide electrical connections to the TOSAs 120a-d and the multi-channel ROSA 130, respectively, within the housing 102. The transmit connecting circuit 104 is electrically connected to the electronic components (e.g., the laser, monitor photodiode, etc.) in each of the TOSAs 120a-d and the receive connecting circuit 108 is electrically connected to the electronic components (e.g., the photodiodes, the TIA, etc.) in the multi-channel ROSA 130. The transmit connecting circuit 104 and the receive connecting circuit 108 include at least conductive paths to provide electrical connections and may also include additional circuitry.

A multi-fiber push on (MPO) connector 110 provides optical connections to the TOSAs 120a-d and the multi-channel ROSA 130 within the housing 102. The MPO connector 110 is optically coupled to the TOSAs 120a-d and the multi-channel ROSA 130 via transmit optical fibers 122 and receive optical fibers 132, respectively. The MPO connector 110 is configured to be coupled to a mating MPO connector 112 such that the optical fibers 122, 132 in the optical transceiver 100 are optically coupled to external optical fibers 114.

Each of the TOSAs 120a-d may be a coaxial TOSA with a coaxial configuration electrically connected at one end to conductive paths on the transmit connecting circuit 104 and optically coupled at the other end to a respective one of the optical fibers 122. Each of the TOSAs 120a-d may include a laser for generating laser light at the assigned channel wavelength and optics for coupling the laser light into the respective optical fiber 122. The lasers in the TOSAs 120a-d thus convert electrical data signals (TX_D1 to TX_D4) received via the transmit connecting circuit 104 into modulated optical signals transmitted over transmit optical fibers 122. The lasers may include, for example, distributed feedback (DFB) lasers with diffraction gratings. Each of the TOSAs 120a-d may also include a monitor photodiode for monitoring the light emitted by the lasers. Each of the TOSAs 120a-d may further include one or more temperature control devices, such as a resistive heater and/or a thermoelectric cooler (TEC), for controlling a temperature of the lasers, for example, to control or stabilize the laser wavelengths.

The multi-channel ROSA 130 includes a photodetector array 134 including, for example, photodiodes optically coupled to a fiber array 133 formed by the ends of the receive optical fibers 132. The multi-channel ROSA 130 also includes a multi-channel transimpedance amplifier 136 electrically connected to the photodetector array 134. The photodetector array 134 and the transimpedance amplifier 136 detect and convert optical signals received from the fiber array 133 into electrical data signals (RX_D1 to RX_D4) that are output via the receive connecting circuit 108.

This embodiment of the optical transceiver 100 does not include an optical multiplexer or demultiplexer. The optical signals may be multiplexed and demultiplexed external to the optical transceiver 100.

Figure 1B:
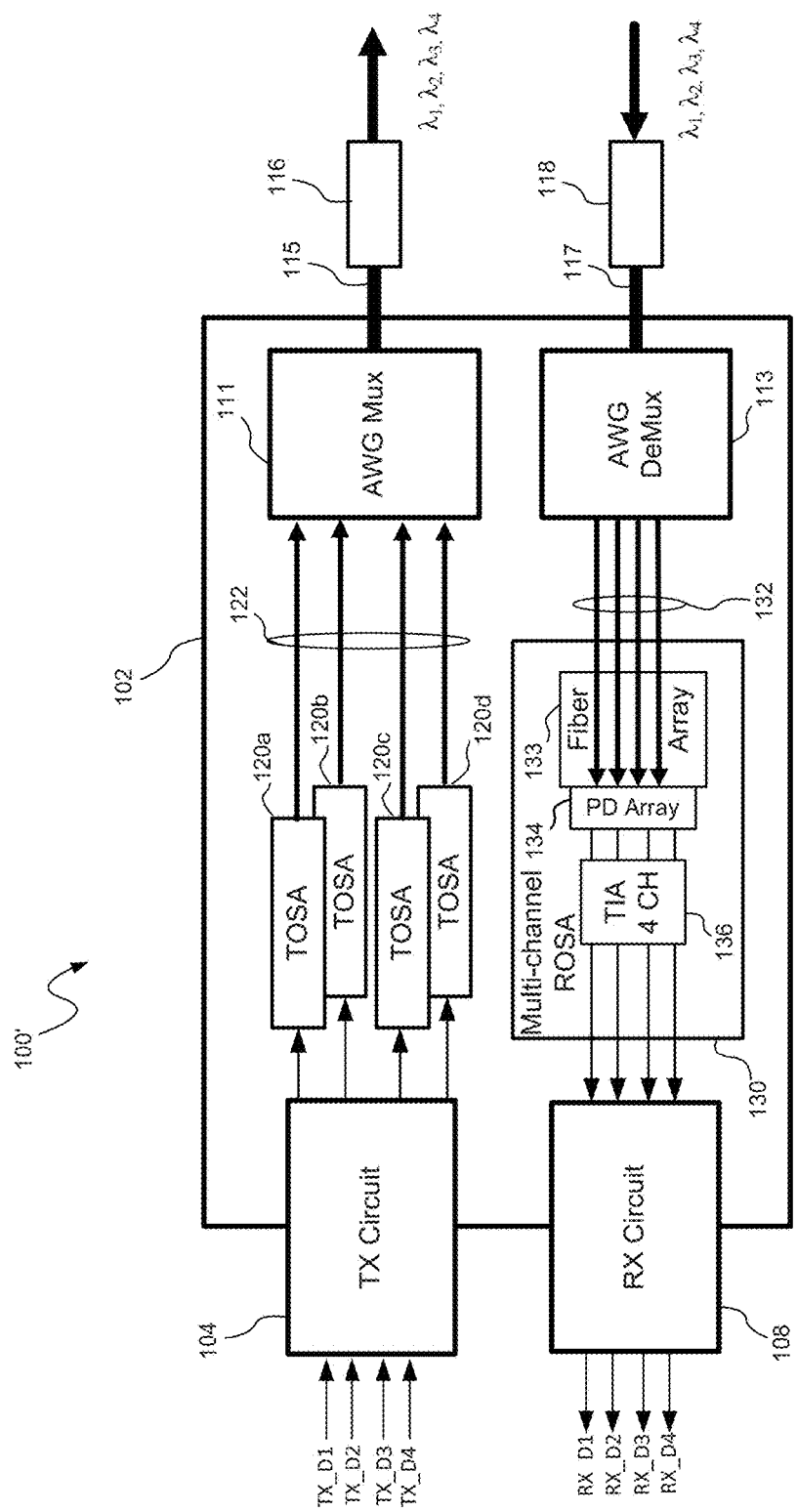

Referring to FIG. 1B, another embodiment of an optical transceiver 100' includes the same light engine (e.g., TOSAs 120a-d and ROSA 130) described above together with an optical multiplexer 111 and an optical demultiplexer 113. The optical multiplexer 111 and the optical demultiplexer 113 both may include arrayed waveguide gratings (AWGs). The optical multiplexer 111 is optically coupled to the transmit optical fibers 122 and the optical demultiplexer 113 is optically coupled to the receive optical fibers 132. The optical multiplexer 111 multiplexes the optical signals being transmitted over transmit optical fibers 122 to provide a multiplexed optical signal on an output optical fiber 115. The optical demultiplexer 113 demultiplexes a multiplexed optical signal received on an input optical fiber 117 to provide received optical signals on receive optical fibers 132. The output optical fiber 115 and the input optical fiber 117 are coupled to an output optical connector 116 and an input optical connector 118, respectively.

This embodiment of the optical transceiver 100' includes 4 channels and may be configured for coarse wavelength division multiplexing (CWDM), although other numbers of channels are possible. This embodiment of the optical transceiver 100' may also be capable of transmission rates of at least about 10 Gbps per channel and transmission distances of 2 km to at least about 10 km and may be used in internet data center applications or fiber to the home (FTTH) applications.

Figure 2:
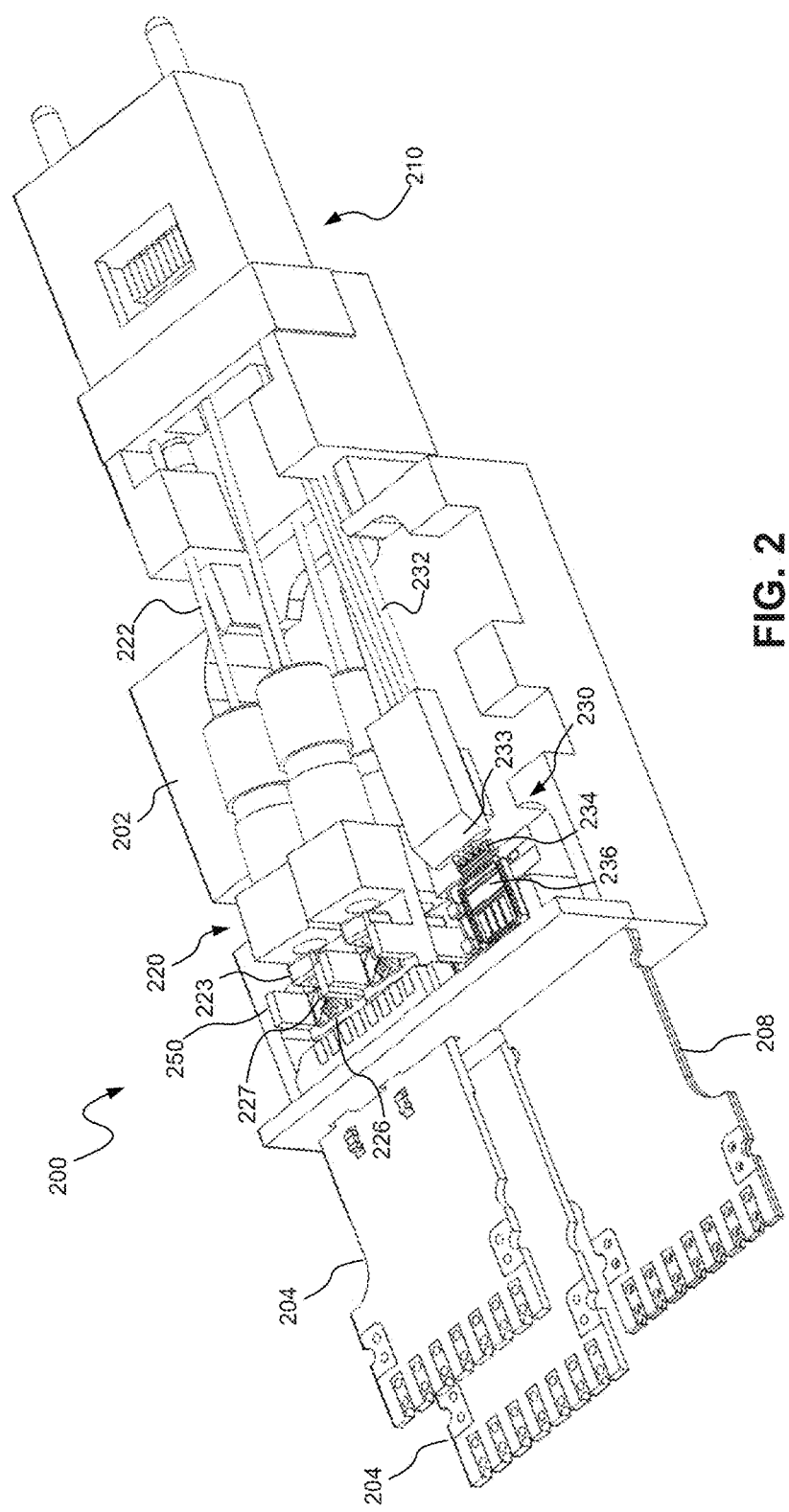
FIG. 2 is a perspective view of an embodiment of an optical transceiver module including coaxial TOSAs with optical fiber coupling receptacles.

Referring to FIG. 2, an embodiment of an optical transceiver module 200 with an MPO connector 210 is described and shown in greater detail. The optical transceiver module 200 may be designed to have a relatively small form factor with minimal space. The optical transceiver module 200 includes a transceiver housing 202, four coaxial TOSAs 220 stacked together in one region of the housing 202, and a multi-channel ROSA 230 located in another region of the housing 202. The coaxial TOSAs 220 are electrically connected to transmit flexible printed circuits (FPCs) 204 at one end of the housing 202 and optically coupled to the MPO connector 210 at the other end of the housing 202 via transmit optical fibers 222. The multi-channel ROSA 230 is electrically connected to a receive flexible printed circuit (FPC) 208 at one end of the housing 202 and optically coupled to the MPO connector 210 at the other end of the housing 202 via receive optical fibers 232.

Each of the coaxial TOSAs 220 includes a laser package 250 that contains a laser submount 226, a diode laser 227 on the submount 226, a lens 223 and an optical isolator (not shown in this view). The laser submount 226 electrically connects the diode laser 227 to the respective transmit FPC 204, for example, using wire bonding. The lens 223 optically couples the laser 227 to the respective transmit optical fiber 222. Each of the coaxial TOSAs 220 has a coaxial configuration such that electrical connections are made from one end of the TOSA 220 and an optical coupling is made from the other end of the TOSA 220. In some embodiments, the laser package may be a cuboid type transistor outline (TO) package, as described in greater detail in U.S. patent application Ser. No. 14/720,336, titled "Coaxial Transmitter Optical Subassembly (TOSA) with Cuboid Type TO Laser package and Optical Transceiver Including Same," which is fully incorporated herein by reference. As used herein, "cuboid type TO package" refers to a laser package structure having a generally cuboid or parallelepiped outer shape formed by at least three substantially flat and orthogonal outer surfaces.

The multi-channel ROSA 230 includes a fiber array 233 optically coupled to a photodetector array 234 and a transimpedance amplifier (TIA) 236 electrically connected to the photodetector array 234. The end faces of the optical fibers 232 in the fiber array 233 may be angled (e.g., at 45°) such that the light is reflected from the angled face to couple with the respective photodiodes in the photodetector array 234. The TIA 236 is electrically connected to the receive FPC 208, for example, using wire bonding.

Referring to FIGS. 3A and 3B, another embodiment of an optical transceiver module 200' including an optical multiplexer and an optical demultiplexer is shown in greater detail. The optical transceiver module 200' includes the coaxial TOSAs 220, the multi-channel ROSA 230, and the FPCs 204, 208, as described above. This embodiment of the optical transceiver module 200' further includes an AWG housing portion 202a that contains a multiplexing AWG 211 and a demultiplexing AWG 213. The AWG housing portion 202a may be coupled to and/or extend from the transceiver housing 202. The multiplexing AWG 211 is optically coupled to the coaxial TOSAs 220 via transmit optical fibers 222 and the demultiplexing AWG 213 is optically coupled to the ROSA 230 via the receive optical fibers 232. The multiplexing AWG 211 and the demultiplexing AWG 213 are optically coupled to output optical connector 216 and input optical connector 218, respectively, via output optical fiber 215 and input optical fiber 217, respectively.

These embodiments of the optical transceiver module 200, 200' may both include coaxial TOSAs 220 with optical fiber coupling receptacles and laser packages, as will be described in greater detail below. The coaxial TOSA 220 with the optical fiber coupling receptacle and laser package may also be used in other types of optical transceivers such as the multi-channel transceiver used in an optical line terminal (OLT), as described in greater detail in U.S. Patent Application Publication No. 2014/0161459, which is fully incorporated herein by reference. The coaxial TOSA 220 with the optical fiber coupling receptacle and laser package may also be used in an optical transmitter without a ROSA.

Figure 4:
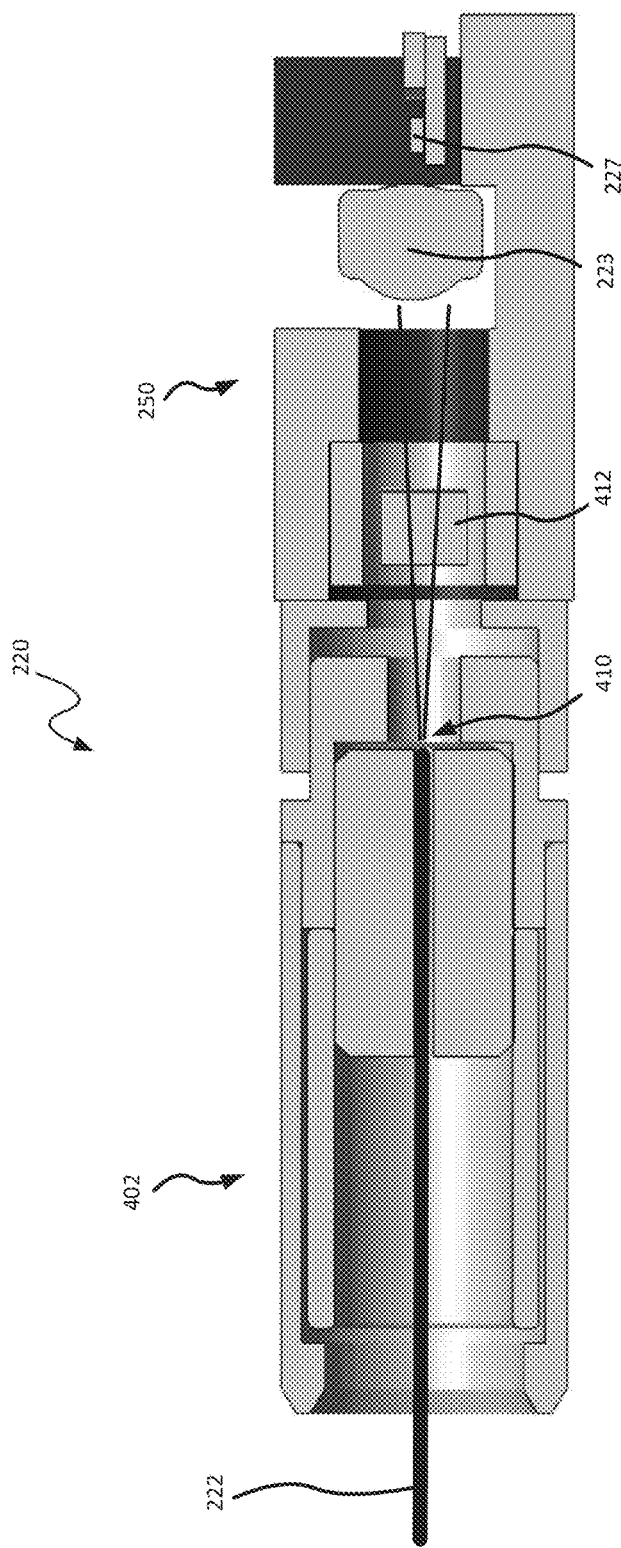
FIG. 4 is a cross-sectional view of an embodiment of the coaxial TOSA with optical isolator for use in the optical transceiver modules shown in FIGS. 2, 3A, and 3B.

As shown in greater detail in FIG. 4, each coaxial TOSA 220 includes an optical fiber coupling receptacle 402 extending from the optical coupling end of the laser package 250. The laser package 250, as described previously, includes a laser or laser diode 227 to generate laser light (e.g., a laser signal) and a lens 223 to focus the laser light to a focal point 410 proximate to an end of an optical fiber in the receptacle 402. The optical fiber end in the receptacle 402 may be an end of the optical fiber 222 extending to a multiplexer or MPO connector in the transceiver or may be a separate optical fiber segment that is optically coupled to the optical fiber 222. One embodiment of the optical fiber coupling receptacle is described in greater detail in U.S. patent application Ser. No. 15/073,322 (now U.S. Pat. No. 9,804,352), entitled Coaxial Transmitter Optical Subassembly (TOSA) with an Optical Fiber Coupling Receptacle, which is filed concurrently herewith and fully incorporated herein by reference. The laser package 250 also includes an optical isolator 412 configured to reduce or eliminate reflection of the laser light in the direction back towards the laser 227.

Both the optical fiber coupling receptacle 402 and laser package 250 are manufactured and coupled together with a level of precision, or manufacturing tolerance, sufficient to ensure that the optical fiber 222, after insertion, is aligned with the focal point 410 of the laser within parameters required to achieve a desired level of signal transmission quality. In some embodiments, the diameter of the receptacle 402 and width of the package 250 may be less than 2.5 mm, and may be referred to as a "mini-coaxial TOSA" (or "miniCX") to distinguish it from more conventionally sized TOSAs. In some embodiment, due at least in part to the relatively smaller size of the miniCX, the manufacturing alignment tolerance between the receptacle and the laser package may be 100 microns or less.

FIGS. 5A and 5B illustrate an optical isolator 412 consistent with an embodiment of the present disclosure. The isolator 412 acts as a one way path for the laser light, preventing undesired feedback of the signal to the laser. Optical isolators, however, generally possess a property that causes the laser light to shift in a particular direction. In other words, the laser light is subject to an offset as it is transmitted through the isolator. In FIG. 5A, laser light 502 is shown entering the right side of the isolator 412 along a centerline (CL) 510 of the isolator. The laser light 504 exiting the isolator is shown to be shifted, in this example, by a distance (d) of 30 microns, in a direction away from the centerline in the plane of the cross section of the isolator. The distance and direction of the shift may depend on the wavelength of the laser light and on properties of the isolator including refractive index, geometry and other factors. The distance and direction may be predetermined, however, for a given operational configuration and known orientation of the isolator in the TOSA, and thus the offset may be corrected. For example, in FIG. 5B, the laser light 506 is shown to enter the isolator 412 at 30 microns offset from the centerline 510 and thus the laser light 508 exits the isolator back at the centerline 510. In some embodiments, this may be accomplished by shifting the laser and lens assembly away from the centerline by an appropriate distance, in this case 30 microns.

FIG. 6A is a top view and FIG. 6B is a top cross-sectional view of the laser package 250 consistent with an embodiment of the present disclosure. FIG. 6A also shows the optical fiber coupling receptacle 402 is shown assembled or fastened to the laser package 250, which includes laser 227, lens 223 and optical isolator 412. In some embodiments, the receptacle 402 may be fastened to the laser package 250 using a welding process or other suitable method. The longitudinal axis of the receptacle 402 is aligned with the longitudinal axis of the laser package 250 along a common centerline 602 parallel to the transmission path of the laser light emitted by the laser 227. In some embodiments, the alignment tolerance may be on the order of 100 microns. The laser 227 and lens 223 are positioned in the package 250 at an offset such that they are aligned to a second longitudinal axis 604. This second axis 604 is shifted from the first axis 602 in a direction and distance that is based on the light shifting characteristics of the optical isolator to provide suitable compensation for those characteristics. In this example, the chosen shifted distance is 30 microns to the right of the centerline 602. In some embodiments, the second axis 604 may be shifted from the first axis 602 by a distance in the range of 10 to 50 microns. A component placement machine may be programmed to place the laser 227 and lens 223 at the appropriate offset during manufacture or fabrication of the laser package 250.

Accordingly, a laser package, consistent with embodiments described herein, is used in a coaxial TOSA and includes a laser diode, lens and optical isolator. The laser diode and lens are configured to provide alignment correction to compensate for light shifting characteristics of the optical isolator.

Consistent with an embodiment, a laser package for a coaxial TOSA includes a laser diode and a lens to focus laser light emitted from the laser diode onto an optical fiber end. The laser diode and the lens are aligned along a first longitudinal axis of the laser package parallel to a transmission path of the laser light. An optical isolator located in the transmission path is aligned along a second longitudinal axis of the laser package. The second longitudinal axis is coincident with a centerline of the laser package and the first longitudinal axis is offset from the second longitudinal axis by a predetermined offset distance to compensate for light shifting characteristics of the isolator.

Consistent with another embodiment, a coaxial TOSA includes an optical fiber coupling receptacle and a laser package coupled to the optical fiber coupling receptacle. The laser package includes a laser diode and a lens to focus laser light emitted from the laser diode onto an optical fiber end coupled to the laser package. The laser diode and the lens are aligned along a first longitudinal axis of the laser package parallel to a transmission path of the laser light. An optical isolator located in the transmission path is aligned along a second longitudinal axis of the laser package. The second longitudinal axis is coincident with a centerline of the laser package and the first longitudinal axis is offset from the second longitudinal axis by a predetermined offset distance to compensate for light shifting characteristics of the isolator.

Consistent with another embodiment, an optical transceiver module includes a transceiver housing, a plurality of coaxial TOSAs located in the transceiver housing for transmitting optical signals at different channel wavelengths, and a multi-channel receiver optical subassembly located in the transceiver housing for receiving optical signals at different channel wavelengths. Each of the coaxial TOSAs includes an optical fiber coupling receptacle and a laser package coupled to the optical fiber coupling receptacle. The laser package includes a laser diode and a lens to focus laser light emitted from the laser diode onto an optical fiber end. The laser diode and the lens are aligned along a first longitudinal axis of the laser package parallel to a transmission path of the laser light. An optical isolator located in the transmission path is aligned along a second longitudinal axis of the laser package. The second longitudinal axis is coincident with a centerline of the laser package and the first longitudinal axis is offset from the second longitudinal axis by a predetermined offset distance to compensate for light shifting characteristics of the isolator.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A laser package for a coaxial transmitter optical subassembly (TOSA) comprising:
    a cuboid housing, the cuboid housing including:
        a laser diode;
        a lens to focus laser light emitted from said laser diode onto an optical fiber end; and
        an optical isolator spaced apart from said lens and said optical fiber end, wherein
            a first optical axis extends directly between said laser diode and said lens;
            a second optical axis extends directly between said lens and said optical isolator; and
            a third optical axis extends directly between said optical isolator and said optical fiber end, and, wherein said first optical axis is parallel to a longitudinal axis of said laser package and is spaced apart from said third optical axis by an offset distance.

2. The laser package of claim 1, wherein said laser diode and said optical fiber end are offset relative to each other to compensate for a shift of said laser light induced by said optical isolator.

3. The laser package of claim 1, wherein said offset distance is in the range of 10 to 50 microns.

4. The laser package of claim 1, wherein said optical isolator is configured to reduce reflection of said laser light towards said laser diode.

5. The laser package of claim 1, wherein the width of said laser package is less than 2.5 mm.

6. The laser package of claim 1, further comprising a laser submount including conductive paths for providing electrical connections to said laser diode.

7. The laser package of claim 1, further comprising a monitor photodiode mounted on said laser submount.

8. A coaxial transmitter optical subassembly (TOSA) comprising:
    an optical fiber coupling receptacle; and
    a laser package coupled to said optical fiber coupling receptacle, said laser package comprising:
    a cuboid housing, the cuboid housing including:
        a laser diode;
        a lens to focus laser light onto an optical fiber end; and
        an optical isolator spaced apart from said lens and said optical fiber end, wherein
            a first optical axis extends directly between said laser diode and said lens;
            a second optical axis extends directly between said lens and said optical isolator; and
            a third optical axis extends directly between said optical isolator and said optical fiber end, and, wherein said first optical axis is parallel to a longitudinal axis of said laser package and is spaced apart from said third optical axis by an offset distance.

9. The coaxial TOSA of claim 8, wherein said laser diode and said optical fiber end are offset relative to each other to compensate for a shift of said laser light induced by said optical isolator.

10. The coaxial TOSA of claim 8, wherein said offset distance is in the range of 10 to 50 microns.

11. The coaxial TOSA of claim 8, wherein said coupling of said optical fiber coupling receptacle to said laser package conforms to an alignment tolerance of 100 microns or less.

12. The coaxial TOSA of claim 8, wherein said optical isolator is configured to reduce reflection of said laser light towards said laser diode.

13. The coaxial TOSA of claim 8, wherein the width of said laser package is less than 2.5 mm.

14. The coaxial TOSA of claim 8, wherein said laser package further comprises a laser submount including conductive paths for providing electrical connections to said laser diode.

15. The coaxial TOSA of claim 8, wherein said laser package further comprises a monitor photodiode mounted on said laser submount.

16. An optical transceiver module comprising:
    a transceiver housing;
    a plurality of coaxial transmitter optical subassemblies (TOSAs) located in said transceiver housing for transmitting optical signals at different channel wavelengths, each of said plurality of coaxial TOSAs comprising:
    an optical fiber coupling receptacle; and
    a laser package coupled to said optical fiber coupling receptacle, said laser package comprising:
        a cuboid housing having a base and at least two sidewalls extending from said base, wherein said base and said at least two sidewalls collectively define a compartment having an open end that is opposite said base, the cuboid housing including:
        a laser diode;
        a lens to focus laser light emitted from said laser diode onto an optical fiber end; and
        an optical isolator spaced apart from said lens and said optical fiber end, wherein a first optical axis extends directly between said laser diode and said lens;

a second optical axis extends directly between said lens and said optical isolator; and a third optical axis extends directly between said optical isolator and said optical fiber end and, wherein said first optical axis is parallel to a longitudinal axis of said laser package and is spaced apart from said third optical axis by an offset distance; and a multi-channel receiver optical subassembly (ROSA) located in said transceiver housing for receiving optical signals at different channel wavelengths.

17. The optical transceiver module of claim 16, wherein said laser diode and said optical fiber end are offset relative to each other to compensate for a shift of said laser light induced by said optical isolator.

18. The optical transceiver module of claim 16, wherein said offset distance is in the range of 10 to 50 microns.

19. The optical transceiver module of claim 16, wherein said coupling of said optical fiber coupling receptacle to said laser package conforms to an alignment tolerance of 100 microns or less.

20. The optical transceiver module of claim 16 further comprising a transmit connecting circuit electrically connected to said coaxial TOSAs and a receive connecting circuit electrically connected to said ROSA.

21. The optical transceiver module of claim 16 further comprising a multi-fiber push on (MPO) connector optically coupled to said coaxial TOSAs and said ROSA.

22. The optical transceiver module of claim 16 further comprising an optical multiplexer optically coupled to said coaxial TOSAs for multiplexing said transmitted optical signals into a transmitted multiplexed optical signal and an optical demultiplexer coupled to said ROSA for demultiplexing a received multiplexed optical signal into said received optical signals.

23. The optical transceiver module of claim 16 wherein said plurality of coaxial TOSAs comprises four coaxial TOSAs configured to transmit at four different channel wavelengths at transmission rates of at least about 10 Gbps per channel and transmission distances of 2 km to at least about 10 km.

* * * * *